Oct. 25, 1932.  H. V. HANSON  1,884,670
TRACE SUPPORT
Filed April 11, 1931  2 Sheets-Sheet 1

INVENTOR
BY Howard V. Hanson
ATTORNEY

Patented Oct. 25, 1932

1,884,670

UNITED STATES PATENT OFFICE

HOWARD V. HANSON, OF WALLA WALLA, WASHINGTON

TRACE SUPPORT

Application filed April 11, 1931. Serial No. 529,357.

This invention relates to trace supports and has as one of its objects to provide a harness that may be converted from a breechingless, or plow harness, into a single breeching harness by the addition only of the single breeching rigging.

Another object of the invention is to provide a trace support that by the substitution of, a tripurpose member only, for a side hip strap, may be converted into a double breeching harness.

A further object of the invention is to provide a trace support that, incorporated with a hip pad, will avoid the hip bone of a harnessed animal and thus prevent chafing.

A further object of the invention is to provide a trace support that will maintain and support the traces of the harness and maintain its position rigidly with respect to the harness.

A further object of the invention is to provide a trace support that will, by its fixed positioning, provide a part of a single breeching rigging, and that by the method of installation will impart the load of the single breeching rigging to the croup of the harnessed animal.

With these and other objects in view reference is now had to the accompanying drawings in which Fig. 1 is a side elevation of a plow harness showing the trace support and its method of securement;

Figure 2:
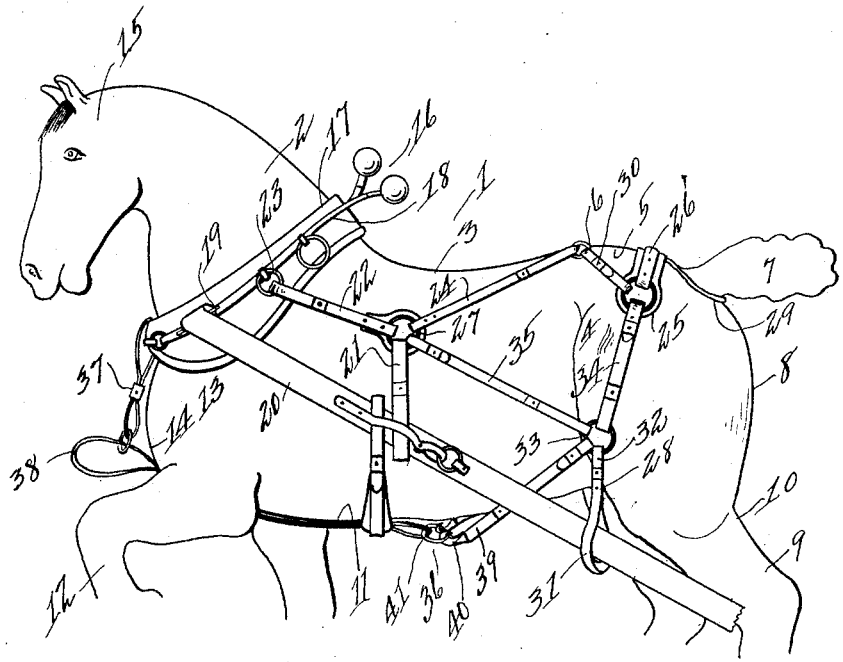
Fig. 2 is a similar view of Fig. 1 showing its adaptability to conversion to a single breeching harness.
Figure 1:
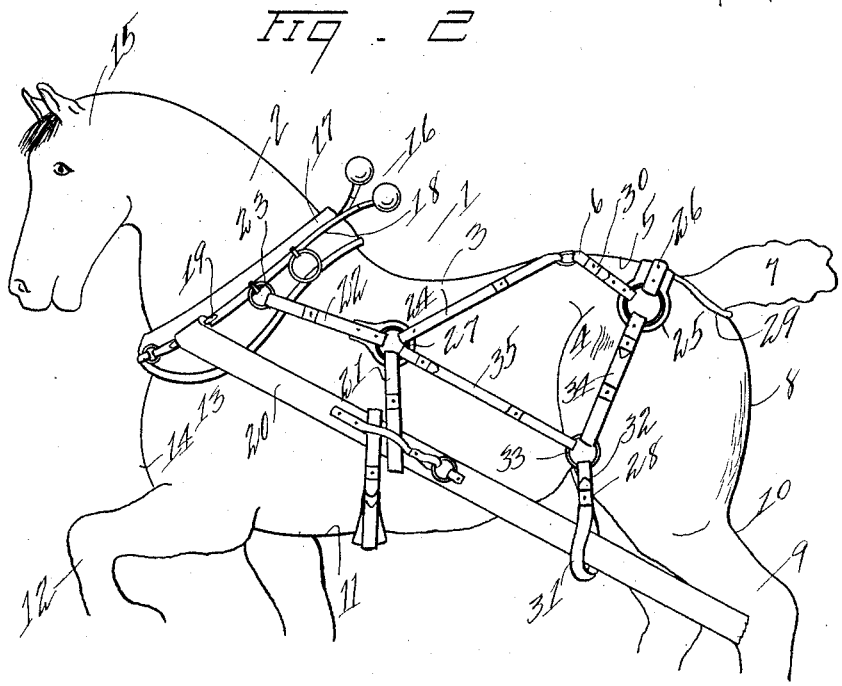

Having reference to the drawings like numerals refer to like parts throughout the several views and the numeral 1 refers to a harnessed animal, in outline, the various major parts of which animal, effecting this invention, including the neck 2, the back 3, the hip bone 4, the croup 5, the sacrum 6, the tail 7, rump 8, hind legs 9, back of hind legs 10, belly 11, fore legs 12, shoulders 13, breast 14, and head 15, and other minor parts which will be enumerated as the specification proceeds.

Mounted on the animal is a harness 16 which consists, in the main, of a collar 17 and hames 18 adapted to rest on the shoulders 13 of the animal, as shown, with loops 19 secured to the hames, to which traces 20 are attached in the usual manner of such construction and assembly (the traces in the drawings being broken away at their lower ends as the lower end thereof has no bearing on the herein described invention).

The traces 20 follow along the side of the animal and are supported by market straps 21 intermediate its ends, the market strap being supported in turn by a shoulder strap 22 secured to the collar through the medium of the ring 23, and a back strap 24 crossing over the back 3 of the animal at its sacrum 6, and continuing to engage distributing rings 25 secured to a hip pad 26 mounted on the croup of the animal and which will be presently explained.

The market strap 21, back strap 24 and shoulder strap 22 are joined together by an anchor ring 27 which is thus secured in a fixed position with respect to the animal, the shoulder strap 22 securing this ring 27 to the collar and against longitudinal movement, with the shoulder strap and back strap preventing downward movement thereof.

The traces 20 are further supported by lazy straps 28 at the lower ends of the traces and the supports for and in combination with the lazy straps form the subject matter of this invention and will now be explained:

Let it here be understood that reference to any strap of the harness in the singular will include the corresponding strap on the opposite side of the animal, where such a strap exists, i. e. that both sides of the harness are identical so far as this invention is concerned.

The hip pad 26 may be secured in position by a crupper 29, attached thereto and passed about the base of the tail of the animal for the purpose, the hip pad 26 however is positioned back of the more elevated sacrum 6, and there secured in position from the collar by the hip pad straps 30, the back straps (of which the hip pad straps are a part), and the shoulder straps 22, and these will maintain the ends of the hip pad and the attached distributing rings 25 in a fixed position with relation to the animal.

The lazy strap 28 consists of a loop 31, encircling the trace, with the end 32 opposite the loop adjustably attached to a single breeching ring 33 positioned at the intersection of a slightly inclined and unitary side hip strap 34 and a flank strap 35, the side hip strap being removably attached to the distributing ring 25 of the hip pad and positioned in prolongation with its ends, and the flank strap being removably attached to the anchor ring 27.

By this arrangement means is provided to fixedly secure, maintain and support the said single breeching ring 33 and the attached lazy strap 28 at all times in a fixed position with respect to the harness, with the lazy strap properly positioned to support the lower end part of the trace; with the single breeching ring properly positioned to act as a part of a single breeching rigging 36, to be presently explained; and with the whole to be secured against longitudinal movement by the flank strap, through the anchor ring 27 and the shoulder strap, to the collar.

By positioning the single breeching ring 33 in this manner, it will be noted by reference to the drawings, that the ring is substantially in a line continued from the ends of the hip pad, and hence with the hip pad positioned on the croup of the animal, as shown, the connecting or side hip strap 34 is positioned to depend rearward of the hip bone 4 of the harnessed animal whereby this part of the animal, which is more susceptible to chafe than the fleshy part, will be rendered free of chafe, with home comfort and less irritation to the animal.

And further, by this positioning of the ring 33 this element is adapted to become a part of the single breeching rigging 36, as shown in Fig. 2, wherein, by the addition of a collar strap 37, a pole strap 38, and a side strap 39 joining the pole strap with the single breeching ring 33, a perfect single breeching harness is provided without additional straps.

Figure 3:
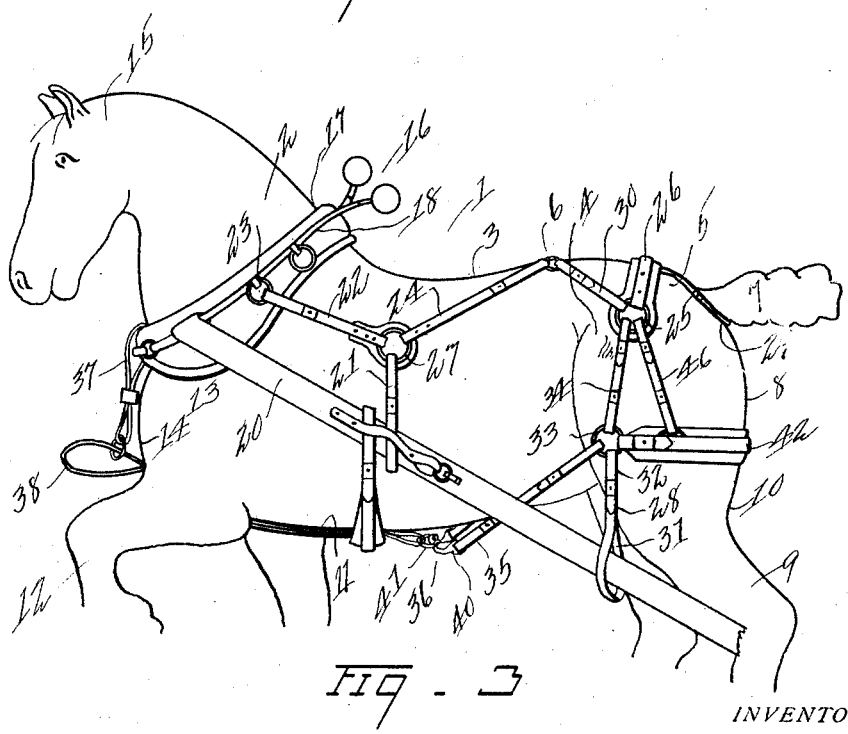
Fig. 3 is a similar view to Fig. 1 but showing a second method of conversion to a single breeching harness, and also providing a double breeching harness.

In Fig. 3 is also shown that a breeching fold 42 may be attached to the harness with little effort when the harness becomes a double breeching harness, at very little comparative expense, and under these conditions, where a breeching fold is used, the flank strap 35 may be utilized as the side strap 39 without affecting the strength of the harness, thus providing a double breeching harness by the addition only of a collar strap 37, a pole strap 38, and breeching fold 42. Obviously snaps 40, preferably used in this case to engage the ring 41 on the rear end of the pole strap, may be conveniently used to connect the flank strap with the anchor ring.

Figure 4:
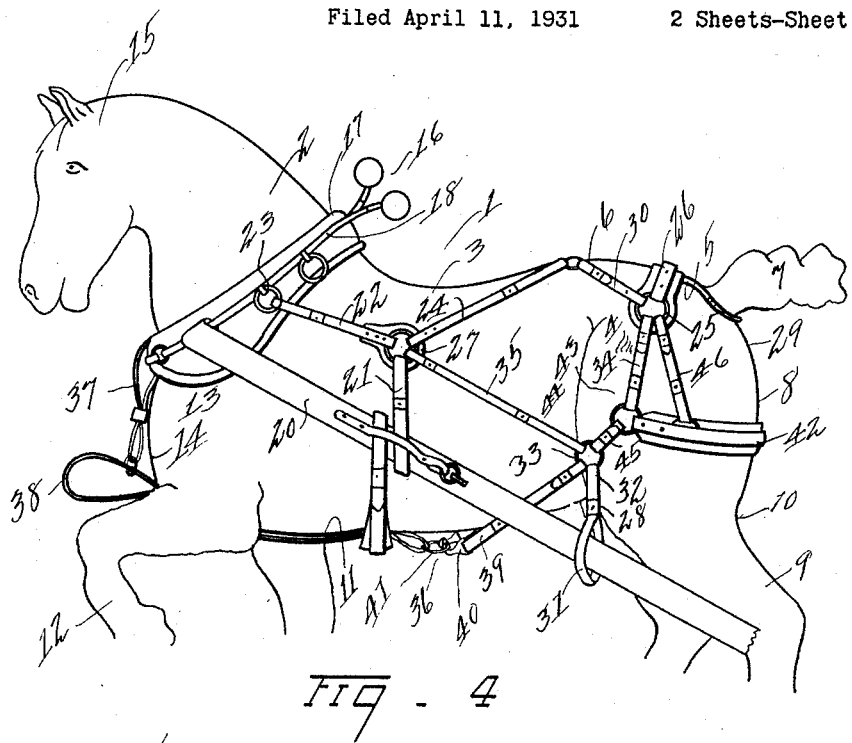
Fig. 4 is a similar view to Fig. 1 showing a modification of that shown in Fig. 3.

In Fig. 4 of the drawings is shown my original harness as patented by me April 1, 1930, No. 1,752,525, in which is shown a tripurpose member 43 consisting of a side hip strap 34, but of shorter overall length than my present side hip strap 34 herein described, which strap terminates in a double breeching ring 44, and is continued by a joint strap 45 that, terminating in a single breeching ring 33 as before, is required to permit conversion to a double breeching harness where the breeching fold 42 is positioned higher on the rump of the animal.

In the tripurpose member the double breeching ring 44 provides for a joint in the whole member whereas by utilizing a single or unitary strap the joint is eliminated and its attendant source of irritation is removed. The present strap is obviously longer than the correspondingly named strap of the tripurpose member and hence permits the breeching fold to fall lower on the animal, however this is compensated for by the sling strap 46 which is a part of the breeching fold and which will support that member.

In use the harness provides a comparatively light weight plow harness that by providing and suitably securing the single breeching ring in the position shown will permit a change from one kind of harness to another kind with an added expense only of the collar strap and the pole strap in the one case, and a breeching fold and a sling strap in the other case, will further permit the change without in any way irritating the animal or destroying the effectiveness of the lazy strap, and will perfectly support the traces.

All parts herein in conflict with my former Patent No. 1,752,525, dated April 1, 1930, are expressly disclaimed.

Having thus described my invention, I claim:

1. In a trace support, the combination with a plow harness, having a hip pad, of a lazy strap, provided with a single breeching ring, and unitary means attached to said single breeching ring to securely support said lazy strap, from said hip pad and rearward of the hip bone of a harnessed animal, and means to secure and maintain said single breeching ring in a fixed position longitudinally on said animal.

2. In a trace support, the combination with a plow harness, provided with anchor rings, and having a hip pad provided with a distributing ring at each end thereof, of a pair of lazy straps provided with single breeching rings, and a unitary means removably secured to each of said distributing rings and to said anchor rings to maintain and to secure said lazy straps in a fixed position with respect to said harness, and simultaneously avoid the hip bones of the harnessed animal.

3. In a trace support, the combination with a plow harness, having a hip pad, of a lazy strap provided with a single breeching ring and a secured support therefore consisting of a unitary side hip strap removably attached at one end to and in continuation of said hip pad, and positioned for dependence rearward of the hip bone of a harnessed animal, and removably attached at its other end to said single breeching ring and a flank strap positioned substantially perpendicular to the side hip strap and secured against longitudinal movement by the collar of said harness, and attached to said single breeching ring.

4. In a trace support, the combination with a plow harness having a hip pad, of a lazy strap disposed on each side thereof and provided respectively with single breeching rings, said rings being disposed to unite with a single breeching rigging, and means to maintain and support said single breeching rings in a fixed position with respect to said harness consisting of unitary side hip straps removably attached to and in continuation of said hip pad and positioned for dependence back of the hip bones of the harnessed animal, and adapted to provide a part of the said single breeching rigging, and flank straps positioned substantially perpendicular to the side hip straps and secured by the collar of said harness and disposed to maintain the single breeching rings and the respective lazy straps against longitudinal movement.

In testimony whereof I affix my signature.

HOWARD V. HANSON.